US011232027B2

United States Patent
Ishii et al.

(10) Patent No.: US 11,232,027 B2
(45) Date of Patent: Jan. 25, 2022

(54) MEMORY CONTROL APPARATUS, MEMORY APPARATUS, INFORMATION PROCESSING SYSTEM, AND MEMORY CONTROL METHOD

(71) Applicant: SONY CORPORATION, Tokyo (JP)

(72) Inventors: Masaaki Ishii, Kanagawa (JP); Hiroaki Sakaguchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 709 days.

(21) Appl. No.: 16/077,287

(22) PCT Filed: Jan. 23, 2017

(86) PCT No.: PCT/JP2017/002138
§ 371 (c)(1),
(2) Date: Aug. 10, 2018

(87) PCT Pub. No.: WO2017/149997
PCT Pub. Date: Sep. 8, 2017

(65) Prior Publication Data
US 2019/0050328 A1 Feb. 14, 2019

(30) Foreign Application Priority Data
Mar. 1, 2016 (JP) .............................. JP2016-039013

(51) Int. Cl.
*G06F 7/78* (2006.01)
*G06F 12/02* (2006.01)
(Continued)

(52) U.S. Cl.
CPC ............ *G06F 12/0292* (2013.01); *G06F 7/78* (2013.01); *G06F 12/02* (2013.01); *G06F 12/06* (2013.01);
(Continued)

(58) Field of Classification Search
CPC .... G06F 7/78; G06F 12/0607; G06F 12/0623; G06F 13/1605
See application file for complete search history.

(56) References Cited

U.S. PATENT DOCUMENTS 5,276,826 A * 1/1994 Rau ..................... G06F 12/0607
710/60
6,381,668 B1    4/2002 Lunteren
(Continued)

FOREIGN PATENT DOCUMENTS

| JP | 62-065148 A  | 3/1987  |
| JP | 2002-342306 A | 11/2002 |
| JP | 2005-092374 A | 4/2005  |

OTHER PUBLICATIONS

Gou, C. and G.N. Gaydadjiev, "Addressing GPU On-Chip Shared Memory Bank Conflicts Using Elastic Pipeline," International Journal of Parallel Programming, 2013, 41: 400-429.*

(Continued)

*Primary Examiner* — Tracy A Warren
(74) *Attorney, Agent, or Firm* — Chip Law Group

(57) ABSTRACT

To prevent a bank conflict in a memory with respect to an access address interval of a wide range. In a plurality of memory modules, an address is provided in a circulation manner for each word. A plurality of access ports is input/output ports for accessing the plurality of memory modules. A plurality of address converting sections converts the address to rearrange an arrangement of the words in the plurality of memory modules by a transposing process for a square matrix of a predetermined size. A connecting section connects the plurality of memory modules and the plurality of access ports in accordance with a result of the address conversion.

9 Claims, 36 Drawing Sheets

(51) Int. Cl.
    *G06F 12/06* (2006.01)
    *G06F 13/16* (2006.01)
(52) U.S. Cl.
    CPC ...... *G06F 12/0607* (2013.01); *G06F 12/0623* (2013.01); *G06F 13/1605* (2013.01)

(56) References Cited

U.S. PATENT DOCUMENTS

| | | | | |
|---|---|---|---|---|
| 6,895,488 | B2 * | 5/2005 | Leung | G06F 12/0292 365/230.03 |
| 7,266,651 | B1 * | 9/2007 | Cypher | G06F 9/34 711/157 |
| 7,640,284 | B1 * | 12/2009 | Goodnight | G06F 17/142 708/404 |
| 2005/0060482 | A1 | 3/2005 | Ishikawa | |

OTHER PUBLICATIONS

International Search Report and Written Opinion of PCT Application No. PCT/JP2017/002138, dated Mar. 21, 2017, 07 pages of English Translation and 07 pages of ISRWO.

International Preliminary Report on Patentability of PCT Application No. PCT/JP2017/002138, dated Sep. 13, 2018, 08 pages of English Translation and 04 pages of IPRP.

\* cited by examiner

FIG. 3

ACCESS ADDRESS INTERVAL=ONE WORD

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

FIG. 4

ACCESS ADDRESS INTERVAL=THREE WORDS

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

FIG. 5

ACCESS ADDRESS INTERVAL=FIVE WORDS

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

FIG. 6

ACCESS ADDRESS INTERVAL=TWO WORDS

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

FIG. 7

ACCESS ADDRESS INTERVAL=FOUR WORDS

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

FIG. 8

ACCESS ADDRESS INTERVAL=SIX WORDS

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

FIG. 9

ACCESS ADDRESS INTERVAL=EIGHT WORDS

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

FIG. 10

ACCESS ADDRESS INTERVAL=TEN WORDS

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
| . | . | . | . | . | . | 70 | . |
| . | . | . | . | . | . | . | . |
| BANK #1 | BANK #2 | BANK #3 | BANK #4 | BANK #5 | BANK #6 | BANK #7 | BANK #8 |

FIG. 14

ACCESS ADDRESS INTERVAL=TWO WORDS

| 0 | 8 | 2 | 10 | 4 | 12 | 6 | 14 |
|---|---|---|----|---|----|---|----|
| 1 | 9 | 3 | 11 | 5 | 13 | 7 | 15 |
| 16 | 24 | 18 | 26 | 20 | 28 | 22 | 30 |
| 17 | 25 | 19 | 27 | 21 | 29 | 23 | 31 |
| 32 | 40 | 34 | 42 | 36 | 44 | 38 | 46 |
| 33 | 41 | 35 | 43 | 37 | 45 | 39 | 47 |
| 48 | 56 | 50 | 58 | 52 | 60 | 54 | 62 |
| 49 | 57 | 51 | 59 | 53 | 61 | 55 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

FIG. 15

ACCESS ADDRESS INTERVAL=FOUR WORDS

| 0 | 8 | 16 | 24 | 4 | 12 | 20 | 28 |
|---|---|----|----|---|----|----|----|
| 1 | 9 | 17 | 25 | 5 | 13 | 21 | 29 |
| 2 | 10 | 18 | 26 | 6 | 14 | 22 | 30 |
| 3 | 11 | 19 | 27 | 7 | 15 | 23 | 31 |
| 32 | 40 | 48 | 56 | 36 | 44 | 52 | 60 |
| 33 | 41 | 49 | 57 | 37 | 45 | 53 | 61 |
| 34 | 42 | 50 | 58 | 38 | 46 | 54 | 62 |
| 35 | 43 | 51 | 59 | 39 | 47 | 55 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

FIG. 16

ACCESS ADDRESS INTERVAL=SIX WORDS

| 0 | 8 | 2 | 10 | 4 | 12 | 6 | 14 |
|---|---|---|---|---|---|---|---|
| 1 | 9 | 3 | 11 | 5 | 13 | 7 | 15 |
| 16 | 24 | 18 | 26 | 20 | 28 | 22 | 30 |
| 17 | 25 | 19 | 27 | 21 | 29 | 23 | 31 |
| 32 | 40 | 34 | 42 | 36 | 44 | 38 | 46 |
| 33 | 41 | 35 | 43 | 37 | 45 | 39 | 47 |
| 48 | 56 | 50 | 58 | 52 | 60 | 54 | 62 |
| 49 | 57 | 51 | 59 | 53 | 61 | 55 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

FIG. 17

ACCESS ADDRESS INTERVAL=EIGHT WORDS

| 0 | 8 | 16 | 24 | 32 | 40 | 48 | 56 |
|---|---|----|----|----|----|----|----|
| 1 | 9 | 17 | 25 | 33 | 41 | 49 | 57 |
| 2 | 10 | 18 | 26 | 34 | 42 | 50 | 58 |
| 3 | 11 | 19 | 27 | 35 | 43 | 51 | 59 |
| 4 | 12 | 20 | 28 | 36 | 44 | 52 | 60 |
| 5 | 13 | 21 | 29 | 37 | 45 | 53 | 61 |
| 6 | 14 | 22 | 30 | 38 | 46 | 54 | 62 |
| 7 | 15 | 23 | 31 | 39 | 47 | 55 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

FIG. 18

ACCESS ADDRESS INTERVAL=TEN WORDS

| BANK #1 | BANK #2 | BANK #3 | BANK #4 | BANK #5 | BANK #6 | BANK #7 | BANK #8 |
|---|---|---|---|---|---|---|---|
| 0 | 8 | 2 | 10 | 4 | 12 | 6 | 14 |
| 1 | 9 | 3 | 11 | 5 | 13 | 7 | 15 |
| 16 | 24 | 18 | 26 | 20 | 28 | 22 | 30 |
| 17 | 25 | 19 | 27 | 21 | 29 | 23 | 31 |
| 32 | 40 | 34 | 42 | 36 | 44 | 38 | 46 |
| 33 | 41 | 35 | 43 | 37 | 45 | 39 | 47 |
| 48 | 56 | 50 | 58 | 52 | 60 | 54 | 62 |
| 49 | 57 | 51 | 59 | 53 | 61 | 55 | 63 |
| ... | ... | ... | ... | ... | ... | 70 | ... |

FIG. 27

| ACCESS PORT | ACCESS DESTINATION BANK | ACCESS TYPE |
|---|---|---|
| PORT#1 | BANK#1 | READ |
| PORT#2 | BANK#8 | READ |
| PORT#3 | BANK#8 | WRITE |
| PORT#4 | BANK#6 | READ |
| PORT#5 | BANK#3 | READ |
| PORT#6 | BANK#2 | READ |
| PORT#7 | BANK#8 | WRITE |
| PORT#8 | BANK#5 | WRITE |

FIG. 28

| BANK | ACCESS SOURCE PORT | ACCESS TYPE | BANK CONFLICT OCCURRENCE |
|---|---|---|---|
| BANK#1 | PORT#1 | READ | NONEXISTENCE |
| BANK#2 | PORT#6 | READ | NONEXISTENCE |
| BANK#3 | PORT#5 | READ | NONEXISTENCE |
| BANK#4 | — | — | NONEXISTENCE |
| BANK#5 | PORT#8 | WRITE | NONEXISTENCE |
| BANK#6 | PORT#4 | READ | NONEXISTENCE |
| BANK#7 | — | — | NONEXISTENCE |
| BANK#8 | PORT#2 | READ | EXISTENCE |
| | PORT#3 | WRITE | |
| | PORT#7 | WRITE | |

| CYCLE | BANK#1 | BANK#2 | BANK#3 | BANK#4 | BANK#5 | BANK#6 | BANK#7 | BANK#8 |
|---|---|---|---|---|---|---|---|---|
| 1 | ACCESS PORT#1 READ | ACCESS PORT#6 READ | ACCESS PORT#5 READ | — | ACCESS PORT#8 WRITE | ACCESS PORT#4 READ | — | ACCESS PORT#2 READ |
| 2 | — | — | — | — | — | — | — | ACCESS PORT#3 WRITE |
| 3 | — | — | — | — | — | — | — | ACCESS PORT#7 WRITE |

FIG. 32
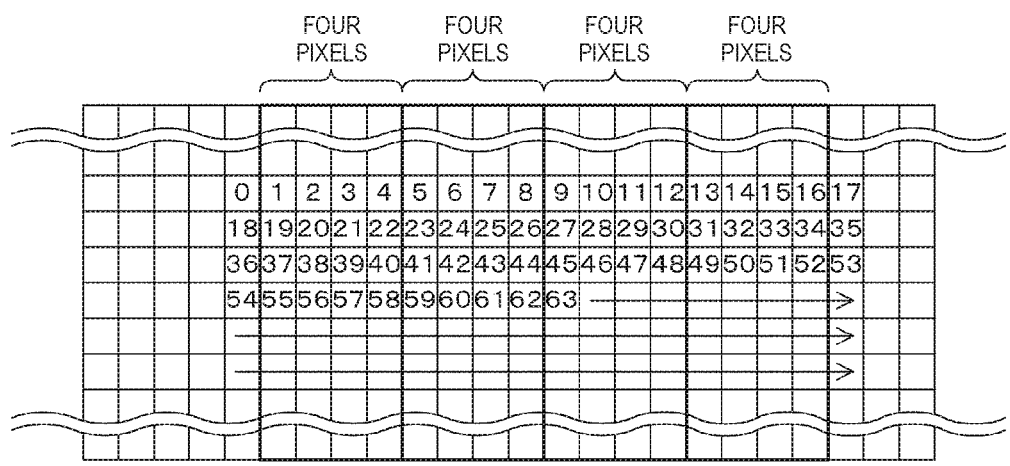
STORAGE

FIG. 35

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

FIG. 36

| 0 | 8 | 16 | 24 | 4 | 12 | 20 | 28 |
|---|---|---|---|---|---|---|---|
| 1 | 9 | 17 | 25 | 5 | 13 | 21 | 29 |
| 2 | 10 | 18 | 26 | 6 | 14 | 22 | 30 |
| 3 | 11 | 19 | 27 | 7 | 15 | 23 | 31 |
| 32 | 40 | 48 | 56 | 36 | 44 | 52 | 60 |
| 33 | 41 | 49 | 57 | 37 | 45 | 53 | 61 |
| 34 | 42 | 50 | 58 | 38 | 46 | 54 | 62 |
| 35 | 43 | 51 | 59 | 39 | 47 | 55 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

FIG. 39

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

FIG. 40

| 0 | 8 | 2 | 10 | 4 | 12 | 6 | 14 |
|---|---|---|---|---|---|---|---|
| 1 | 9 | 3 | 11 | 5 | 13 | 7 | 15 |
| 16 | 24 | 18 | 26 | 20 | 28 | 22 | 30 |
| 17 | 25 | 19 | 27 | 21 | 29 | 23 | 31 |
| 32 | 40 | 34 | 42 | 36 | 44 | 38 | 46 |
| 33 | 41 | 35 | 43 | 37 | 45 | 39 | 47 |
| 48 | 56 | 50 | 58 | 52 | 60 | 54 | 62 |
| 49 | 57 | 51 | 59 | 53 | 61 | 55 | 63 |
| ⋮ | ⋮ | ⋮ | ⋮ | ⋮ | ⋮ | ⋮ | ⋮ |
| BANK #1 | BANK #2 | BANK #3 | BANK #4 | BANK #5 | BANK #6 | BANK #7 | BANK #8 |

MEMORY CONTROL APPARATUS, MEMORY APPARATUS, INFORMATION PROCESSING SYSTEM, AND MEMORY CONTROL METHOD

CROSS REFERENCE TO RELATED APPLICATIONS

This application is a U.S. National Phase of International Patent Application No. PCT/JP2017/002138 filed on Jan. 23, 2017, which claims priority benefit of Japanese Patent Application No. JP 2016-039013 filed in the Japan Patent Office on Mar. 1, 2016. Each of the above-referenced applications is hereby incorporated herein by reference in its entirety.

TECHNICAL FIELD

The present technology relates to a memory apparatus. For details, it relates to a memory apparatus including a plurality of memory modules, a memory control apparatus to control the memory apparatus, an information processing system including the memory apparatus, and a processing method in these.

BACKGROUND ART

Like a GPU (Graphics Processing Unit), in a parallel arithmetic operation apparatus in which a plurality of arithmetic operation processing threads is executed simultaneously in parallel, simultaneous access for a shared memory shared by a plurality of threads occurs. As a countermeasure for this simultaneous access, a method can be considered that arbitrates accesses between the threads and narrows down the threads capable of accessing a memory to one thread. However, since the accesses are serialized in the time direction, the throughput of the shared memory access lowers, which leads to that the performance of the parallel arithmetic operation apparatus lowers. For this reason, in a general countermeasure, a shared memory is divided into a plurality of memory banks, and accesses are dispersed by being distributed to the memory banks correspondingly to memory addresses, whereby simultaneous parallel accesses for the shared memory are made possible.

However, even if accesses are dispersed into a plurality of banks correspondingly to addresses in this way, it is not always possible to execute a plurality of accesses simultaneously in parallel perfectly. For example, in the case where a plurality of threads accesses a shared memory at a fixed access address interval, the accesses to the memory bank may collide with each other by being distributed to the same bank depending on the interval, and a bank conflict occurs. In order to arbitrate this bank conflict, the serialization of accesses is required. As a countermeasure for this bank conflict, a technique has been known that reduces a bank conflict by interleave that interchanges accesses between memory banks by address conversion (for example, refer to Patent Literature 1).

CITATION LIST

Patent Literature

Patent Literature 1: JP S62-065148A

DISCLOSURE OF INVENTION

Technical Problem

In the above-mentioned usual technology, bank conflict is reduced by performing interleave between memory banks by address conversion with a simple circuit. However, the effect is limited to a case where an access address interval is a power of 2 and its range is from 2 to $2^n$ (here, $2^n$ is the number of banks). Accordingly, there is a problem that the effect of the reduction of bank conflicts is limited.

The present technology is created in view of such a situation, and an object is to prevent a bank conflict in a memory with respect to an access address interval of a wide range.

Solution to Problem

The present technology has been made to solve the above problem. According to a first aspect of the present technology, there is provided a memory control apparatus and a memory control method. The memory control apparatus includes: a plurality of access ports that is used for accessing a plurality of memory modules in which an address is provided in a circulation manner for each word; a plurality of address converting sections that converts the address to rearrange an arrangement of the words in the plurality of memory modules by a transposing process for a square matrix of a predetermined size; and a connecting section that connects the plurality of memory modules and the plurality of access ports in accordance with a result of the address conversion. This brings an action that competition in the memory module is avoided by performing the address conversion so as to rearrange the arrangement of words in an external memory module by the transposing process for a square matrix.

In addition, according to the first aspect, the predetermined size of the square matrix may be a power of two. In general, the number of memory modules is assumed to be set to the power of two. This brings an action that it become easy to align with the size of the transposing process.

In addition, according to the first aspect, the address converting section may perform interchanging of bits in accordance with the predetermined size in the address. This brings an action that the address conversion is performed so as to rearrange the arrangement of the words in the memory module by the transposing process for a square matrix.

In addition, according to the first aspect, the connecting section may include a plurality of address selectors that is disposed for each of the plurality of memory modules and selects the address from the plurality of access ports, a plurality of write-in data selectors that is disposed for each of the plurality of memory modules and selects write-in data from the plurality of access ports, a plurality of read-out data selectors that is disposed for each of the plurality of access ports and selects read-out data from the plurality of memory modules, and a selector control section that controls the plurality of address selectors, the plurality of write-in data selectors, and the plurality of read-out data selectors in accordance with the address from the access port. This brings an action that a plurality of memory modules and a plurality of access ports are connected in accordance with the address conversion that has rearranged the arrangement of the words in the memory module by the transposing process for a square matrix.

In addition, according to the first aspect, the selector control section may include a detecting section that detects competition in access in the plurality of memory modules, and an arbitrating section that arbitrates competition in access detected by the detecting section and controls the plurality of address selectors, the plurality of write-in data selectors, and the plurality of read-out data selectors. This brings an action that copes with the competition incapable of being prevented only with the address conversion, by arbitration.

In addition, according to a second aspect of the present technology, a memory apparatus includes: a plurality of memory modules in which an address is provided in a circulation manner for each word; a plurality of access ports that is used for accessing the plurality of memory modules; a plurality of address converting sections that converts the address to rearrange an arrangement of the words in the plurality of memory modules by a transposing process for a square matrix of a predetermined size; and a connecting section that connects the plurality of memory modules and the access ports in accordance with the address conversion. This brings an action that competition in the memory module is avoided by performing the address conversion so as to rearrange the arrangement of the words in the memory module in the memory apparatus by the transposing process for a square matrix.

In addition, according to the second aspect, each of the plurality of memory modules may be a memory bank. This brings an action that a bank conflict is avoided in the memory apparatus with the memory bank constitution.

In addition, according to a third aspect of the present technology, an information processing system includes: a plurality of memory modules in which an address is provided in a circulation manner for each word; a plurality of access ports that is used for accessing the plurality of memory modules; a plurality of arithmetic units that requires access for the plurality of memory modules via the plurality of access ports; a plurality of address converting sections that converts the address to rearrange an arrangement of the words in the plurality of memory modules by a transposing process for a square matrix of a predetermined size; and a connecting section that connects the plurality of memory modules and the access ports in accordance with the address conversion. This brings an action that competition in the memory module is avoided by performing the address conversion so as to rearrange the arrangement of the words in the memory module by the transposing process for a square matrix against the access from the arithmetic unit.

Advantageous Effects of Invention

According to the present technology, it is possible to attain an excellent effect that can prevent a bank conflict in a memory with respect to an access address interval of a wide range. Note that effects described herein are not necessarily limitative, and any effect that is desired to be described in the present disclosure may be admitted.

BRIEF DESCRIPTION OF DRAWINGS

FIG. 3 is a diagram showing an access mode in the case where an access address interval is one word in a general memory bank constitution.

FIG. 4 is a diagram showing an access mode in the case where an access address interval is three words in a general memory bank constitution.

FIG. 5 is a diagram showing an access mode in the case where an access address interval is five words in a general memory bank constitution.

FIG. 6 is a diagram showing an access mode in the case where an access address interval is two words in a general memory bank constitution.

FIG. 7 is a diagram showing an access mode in the case where an access address interval is four words in a general memory bank constitution.

FIG. 8 is a diagram showing an access mode in the case where an access address interval is six words in a general memory bank constitution.

FIG. 9 is a diagram showing an access mode in the case where an access address interval is eight words in a general memory bank constitution.

FIG. 10 is a diagram showing an access mode in the case where an access address interval is ten words in a general memory bank constitution.

FIG. 14 is a diagram showing an access mode in the case where an access address interval after the transposing process for 2×2 is two words in an embodiment of the present technology.

FIG. 15 is a diagram showing an access mode in the case where an access address interval after the transposing process for 4×4 is four words in an embodiment of the present technology.

FIG. 16 is a diagram showing an access mode in the case where an access address interval after the transposing process for 2×2 is six words in an embodiment of the present technology.

FIG. 17 is a diagram showing an access mode in the case where an access address interval after the transposing process for 8×8 is eight words in an embodiment of the present technology.

FIG. 18 is a diagram showing an access mode in the case where an access address interval after the transposing process for 2×2 is ten words in an embodiment of the present technology.

FIG. 27 is a diagram showing an example of a request for a bank 110 for each of access ports 190 in a second embodiment of the present technology.

FIG. 28 is a diagram showing one example of a detection result of a bank conflict in a second embodiment of the present technology.

FIG. 32 is a diagram showing an arrangement example of image data for a bank 110 in a first application example in an embodiment of the present technology.

FIG. 35 is a diagram showing an access mode example in four parallel filtering processes for every four pixels in a general memory bank constitution.

FIG. 36 is a diagram showing an access mode in a memory bank constitution of a first application example in an embodiment of the present technology.

FIG. 39 is a diagram showing an access mode example in eight parallel filtering processes for every two pixels in a general memory bank constitution.

FIG. 40 is a diagram showing an access mode in a memory bank constitution of a second application example in an embodiment of the present technology.

MODE(S) FOR CARRYING OUT THE INVENTION

Hereinafter, a mode for executing the present technology (hereinafter, referred to as an embodiment) will be described. The description is given in the following order.

1. First embodiment (example where transposition is performed by address conversion)

2. Second embodiment (example where bank conflict is arbitrated)

3. Application example (application example for filtering process)

1. First Embodiment

[Constitution of Memory Apparatus]

Figure 1:
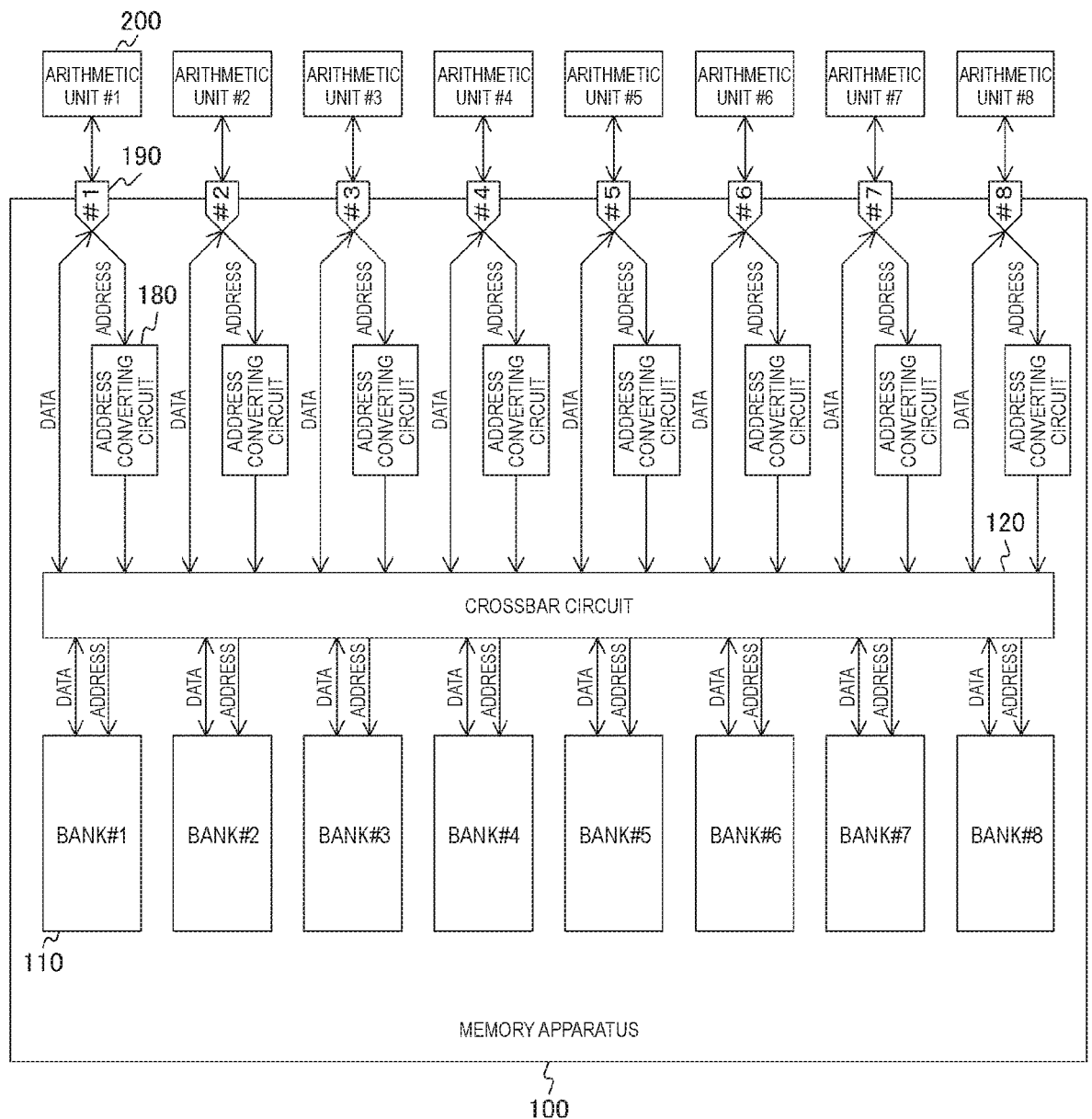
FIG. 1 is a diagram showing one example of the whole constitution of a memory apparatus 100 in an embodiment of the present technology.

FIG. 1 is a diagram showing one example of the whole constitution of a memory apparatus 100 in an embodiment of the present technology. This memory apparatus 100 includes eight memory banks (hereinafter, referred to as a "bank") 110 and eight access ports 190, which are connected to eight arithmetic units 200, respectively. The eight arithmetic units 200 request accesses for the eight banks 110 via the eight access ports 190. Therefore, unless bank conflict occurs, it is constituted to be able to perform input and output for at most eight addresses and data simultaneously.

This memory apparatus 100 includes, in addition to the eight banks 110, a crossbar circuit 120 and eight address converting circuits 180. It is assumed that a data access unit in the memory apparatus 100 is four bytes, these four bytes are made one word, and an address is assigned to each word. That is, the eight banks 110 are provided with an address in a circulation manner for each word.

In this connection, in here, an example is shown in which the eight access ports 190 and the eight banks 110 are disposed for the eight arithmetic units 200. However, these numerical values are one specific example, and other numerical values may be applied.

The bank 110 is a memory that stores data. In a write-in access, a word address and write-in data are received from the crossbar circuit 120, and the data is written in the position of the word address. In a read-out access, a word address is received from the crossbar circuit 120, data is read out from the position of the word address, and the data is transmitted to the crossbar circuit 120. It should be noted that the bank 110 is one example of a memory module described in claims.

The address converting circuit 180 is a circuit that performs address conversion so as to make the bank 110 interleave in order to cancel a bank conflict. The details of the address conversion will be mentioned later. It should be noted that the address converting circuit 180 is one example of an address converting section described in claims.

The access port 190 is an input/output port for receiving an input of an address, an addressing mode, and write-in data from the arithmetic unit 200 and for outputting read-out data to the arithmetic unit 200. The access port 190 is connected to the address converting circuit 180 and the crossbar circuit 120. The address, the addressing mode, and the write-in data input from the arithmetic unit 200 are transmitted to the address converting circuit 180, and the read-out data received from the crossbar circuit 120 is output to the arithmetic unit 200.

The crossbar circuit 120 is a circuit with which the address converting circuit 180, the access port 190, and the bank 110 are connected with each other. The constitution of the crossbar circuit 120 is described with reference to the following diagram. It should be noted that the crossbar circuit 120 is one example of a connecting section described in claims.

Figure 2:
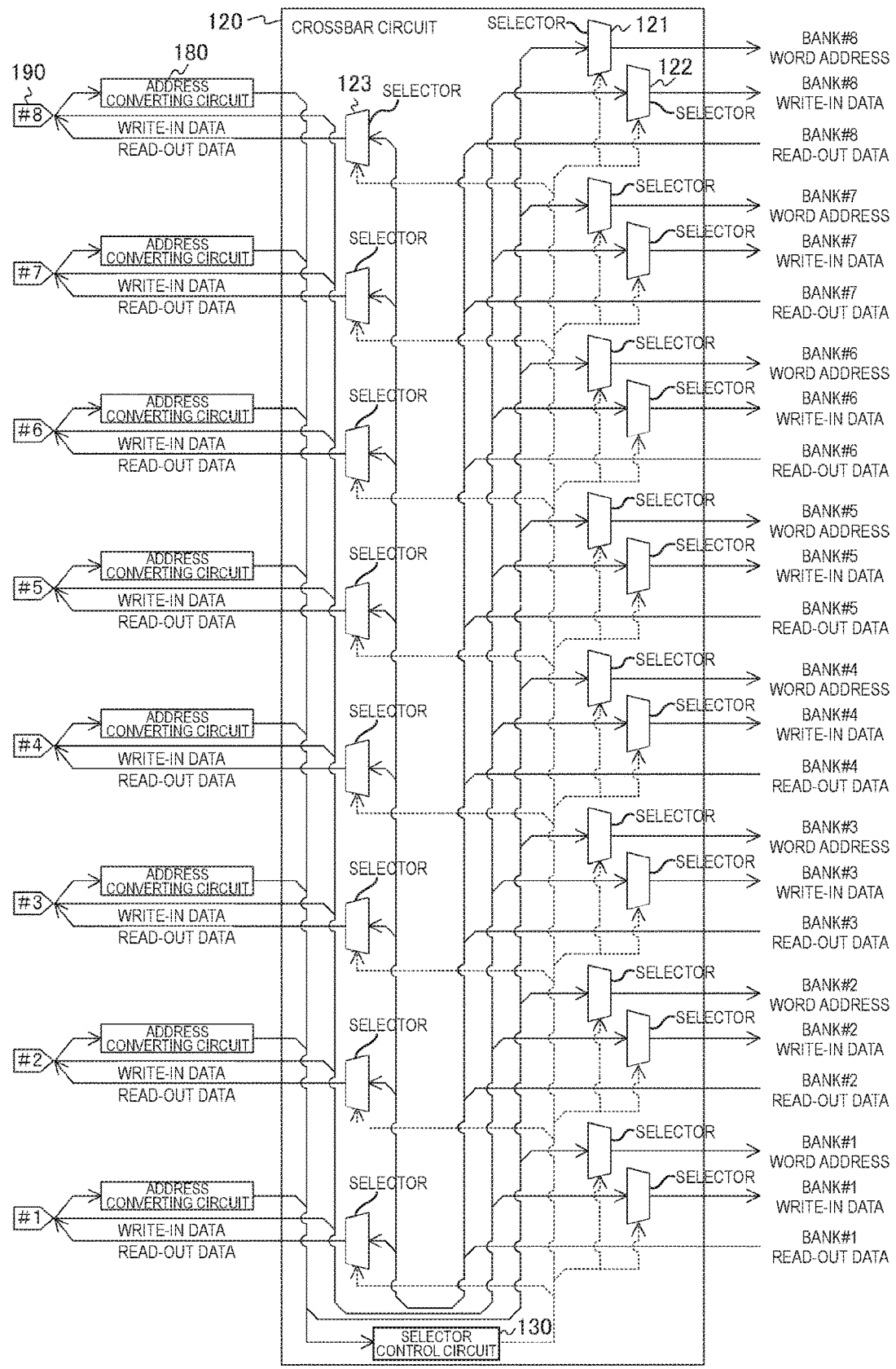
FIG. 2 is a diagram showing a constitution example of a crossbar circuit 120 in an embodiment of the present technology.

FIG. 2 is a diagram showing a constitution example of the crossbar circuit 120 in an embodiment of the present technology. This crossbar circuit 120 performs distribution of addresses and write-in data from the address converting circuits 180 and the access ports 190 to the banks 110 and distribution of read-out data from the banks 110 to the access ports 190. The crossbar circuit 120 includes a selector control circuit 130, eight address selectors 121, eight write-in data selectors 122, and eight read-out data selectors 123.

The address selector 121 is disposed for each of the banks 110, and, is a circuit that selects an address at the time of accessing the corresponding bank 110. The address selector 121 selects one of the address converting circuits 180 that supplies an address, on the basis of an instruction from the selector control circuit 130, and, transmits the address to the bank 110 connected with itself.

The write-in data selector 122 is disposed for each of the banks 110, and, is a circuit that selects write-in data to the corresponding bank. The write-in data selector 122 selects one of the write-in data from the access ports 190 on the basis of an instruction from the selector control circuit 130, and, transmits the write-in data to the bank 110 connected with itself.

The read-out data selector 123 is disposed for each of the access ports 190, and, is a circuit that selects read-out data from the banks 110 for the corresponding access port 190. The read-out data selector 123 selects one of the read-out data from the banks 110 on the basis of an instruction from the selector control circuit 130, and, transmits the read-out data to the access port 190 connected with itself.

The selector control circuit 130 is a circuit that controls the above-mentioned three types of selectors 121 to 123. Upon receipt of an address from the address converting circuit 180, the selector control circuit 130 reads out a bank address indicated from a bit 0 to a bit 2 of the address, and, discriminates the bank accessed from the access port 190. Then, on the basis of the bank discrimination result, it instructs the address selector 121 about the address converting circuit 180 that becomes the transmission source of an address. Moreover, in a write-in access, on the basis of the bank discrimination result, the selector control circuit 130 instructs the write-in data selector 122 about the access port that becomes the transmission source of write-in data. Moreover, in a read-out access, on the basis of the bank discrimination result, it instructs the read-out data selector 123 about the bank that becomes the transmission source of read-out data. It should be noted that the selector control circuit 130 is one example of a selector control section described in claims.

In this way, the crossbar circuit 120 connects the plurality of banks 110 and the plurality of access ports 190 in accordance with the result of the address conversion by the address converting circuit 180.

[Bank Conflict and Address Conversion]

In the above-mentioned memory bank constitution, there is a fear that respective accesses from the access ports 190 may cause a bank conflict for the banks 110 depending on the address interval. Hereinafter, the mode will be described.

FIG. 3 is a diagram showing an access mode in the case where an access address interval is one word, in a general memory bank constitution. As shown in the same diagram, in the case where the memory accesses from the arithmetic unit are continuous as a whole, that is, in the case where an access address interval is one word, since all the accesses are dispersed toward separate banks, a bank conflict does not occur inevitably.

In this connection, as mentioned above, the eight banks 110 are provided with addresses in a circulation manner for each word. For example, the head word of a bank #1 is provided with an address of "0", the head word of a bank #2 is provided with an address of "1", and the head word of a bank #8 is provided with an address of "7". Moreover, the second word of the bank #1 is provided with an address of "8", the second word of the bank #2 is provided with an address of "9", and the second word of the bank #8 is provided with an address of "15".

FIG. 4 is a diagram showing an access mode in the case where an access address interval is three words in the general memory bank constitution. FIG. 5 is a diagram showing an access mode in the case where an access address interval is five words in the general memory bank constitution. As shown in these diagrams, also in odd-number (exceeding one) words, due to the matter that the number of banks is $2^n$, since all the accesses are dispersed toward separate banks, a bank conflict does not occur inevitably.

FIG. 6 is a diagram showing an access mode in the case where an access address interval is two words in the general memory bank constitution. FIG. 7 is a diagram showing an access mode in the case where an access address interval is four words in the general memory bank constitution. FIG. 8 is a diagram showing an access mode in the case where an access address interval is six words in the general memory bank constitution. FIG. 9 is a diagram showing an access mode in the case where an access address interval is eight words in the general memory bank constitution. FIG. 10 is a diagram showing an access mode in the case where an access address interval is ten words in the general memory bank constitution.

As shown in these diagrams, in the case where the memory accesses from the arithmetic units are intermittent for every even-number words as a whole, since a plurality of accesses overlap at the same bank, a bank conflict occurs. Then, examination is given for a method of cancelling a bank conflict for the case where an access address interval is even-number words.

Figure 11:
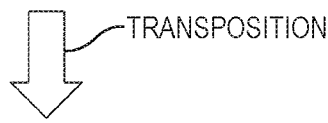
FIG. 11 is a diagram showing an example of a transposing process for 2×2 by address conversion in an embodiment of the present technology.
Figure 12:
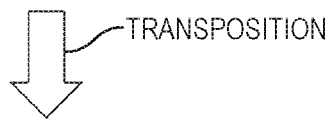
FIG. 12 is a diagram showing an example of a transposing process for 4×4 by address conversion in an embodiment of the present technology.
Figure 13:
FIG. 13 is a diagram showing an example of a transposing process for 8×8 by address conversion in an embodiment of the present technology.

FIG. 11 is a diagram showing an example of a transposing process for 2×2 by the address conversion in the embodiment of the present technology. FIG. 12 is a diagram showing an example of a transposing process for 4×4 by the address conversion in the embodiment of the present technology. FIG. 13 is a diagram showing an example of a transposing process for 8×8 by the address conversion in the embodiment of the present technology.

As shown in these diagrams, a plurality of words of a plurality of banks is combined so as to define a block in the form of a square matrix of 2×2 words, 4×4 words, and 8×8 words. In this block, in the case where the transposition is performed for the matrix, words that are lined up in the longitudinal direction, i.e., in the same bank due to an access address interval, become to be lined up in the transverse direction, i.e., by being dispersed in the banks, whereby a bank conflict is canceled. In this way, bank interleave in which the transposition is performed in units of a block by the address conversion, brings an action that a bank conflict is canceled.

These address conversions are performed by the address converting circuit 180. That is, the address converting circuit 180 converts addresses such that the arrangement of the words in a plurality of banks 110 is rearranged by the transposing process for a square matrix of a predetermined size. This predetermined size is a power of 2. For example, as shown below, a transposing process for 2×2, 4×4, 8×8 and the like is assumed.

In the below, description is given for a situation where this bank interleave cancels a bank conflict having occurred in the case where an access address interval is two words, four words, six words, and eight words.

FIG. 14 is a diagram showing an access mode in the case where an access address interval after the transposing process for 2×2 is two words in the embodiment of the present technology. As shown in FIG. 6, in the case where an access address interval is two words, a bank conflict for 2 words occurs in the bank 1, the bank 3, the bank 5, and the bank 7. For this, in the case where the transposition for 2×2 is performed by the address conversion, it turns out that the two wards having caused the bank conflict are dispersed to separate banks, and the bank conflict is canceled.

FIG. 15 is a diagram showing an access mode in the case where an access address interval after the transposing process for 4×4 in the embodiment of the present technology, is four words. As shown in FIG. 7, a bank conflict for four words occurs in the bank 1 and the bank 5. For this, in the case where the transposition for 4×4 is performed by the address conversion, it turns out that all the four wards having caused the bank conflict are dispersed to separate banks, and the bank conflict is canceled.

FIG. 16 is a diagram showing an access mode in the case where an access address interval after the transposing process for 2×2 is six words in the embodiment of the present technology. As shown in FIG. 8, in the case where an access address interval is six words, a bank conflict for 2 words occurs in the bank 1, the bank 3, the bank 5, and the bank 7. For this, in the case where the transposition for 2×2 is performed by the address conversion, it turns out that the two wards having caused the bank conflict are dispersed to separate banks, and the bank conflict is canceled.

FIG. 17 is a diagram showing an access mode in the case where an access address interval after the transposing process for 8×8 is eight words in the embodiment of the present technology. As shown in FIG. 9, in the case where an access address interval is eight words, a bank conflict for 8 words occurs in the bank 1. For this, in the case where the transposition for 8×8 is performed by the address conversion, it turns out that all the eight wards having caused the bank conflict are dispersed to separate banks, and the bank conflict is canceled.

FIG. 18 is a diagram showing an access mode in the case where an access address interval after the transposing process for 2×2 is ten words in the embodiment of the present technology. As shown in FIG. 10, in the case where an access address interval is ten words, a bank conflict for 2 words occurs in the bank 1, the bank 3, the bank 5, and the bank 7. For this, in the case where the transposition for 2×2 is performed by the address conversion, it turns out that the two wards having caused the bank conflict are dispersed to separate banks, and the bank conflict is canceled.

Hereinafter, description is given for a specific example of the address conversion to realizes the transposing process in order to cancel such a bank conflict. The address converting circuit 180 receives an address and an addressing mode from the access port 190, performs the address conversion correspondingly to the bank interleave mode designated as the addressing mode, and, transmits the address after the conversion to the crossbar circuit 120.

As the bank interleave mode, four types of operation modes of "non-interleave", "2×2 interleave", "4×4 interleave", and "8×8 interleave", are assumed. The non-interleave mode is a mode in which the address conversion is not performed. The 2×2 interleave mode is a mode in which the transposition for 2×2 is performed by the address conversion. The 4×4 interleave mode is a mode in which the transposition for 4×4 is performed by the address conversion. The 8×8 interleave mode is a mode in which the transposition for 8×8 is performed by the address conversion. That is, in the address converting circuit 180, address conversion to transpose data in units of a power of 2 is performed.

Figure 19:
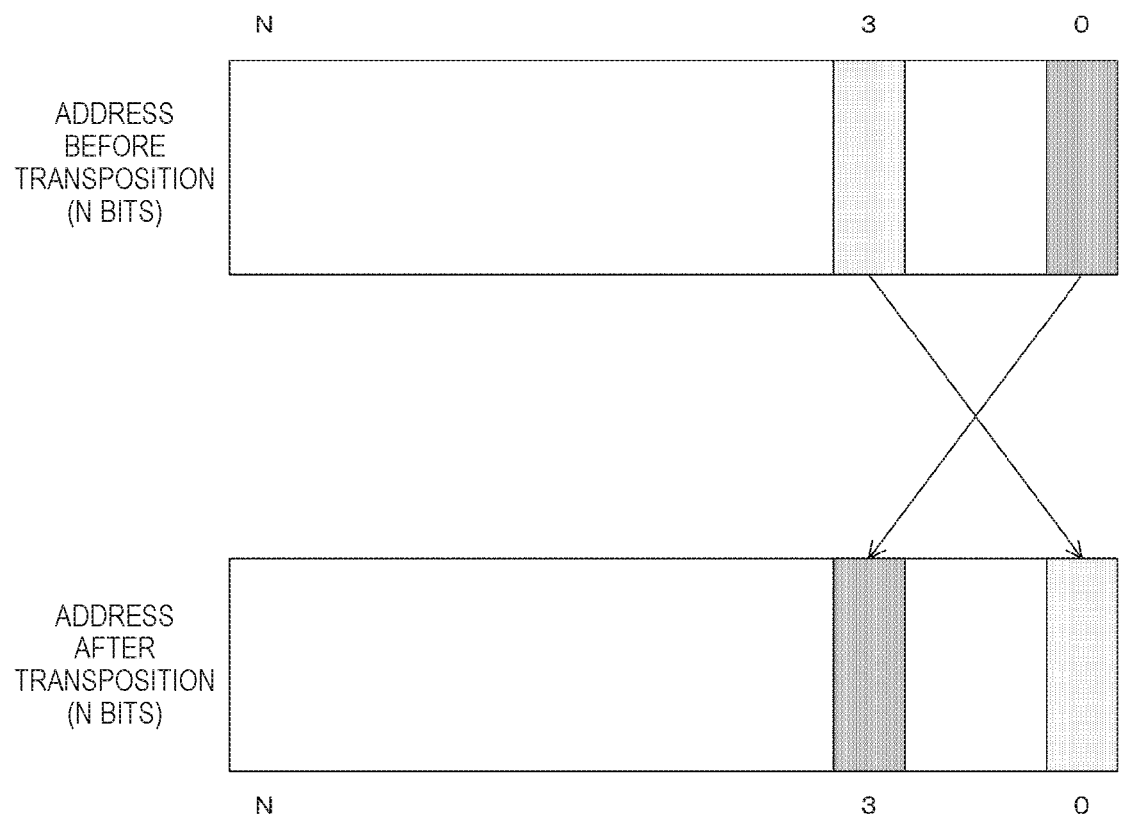
FIG. 19 is a diagram showing one example of the address conversion for performing the transposing process for 2×2 in an address converting circuit 180 in an embodiment of the present technology.

FIG. 19 is a diagram showing one example of the address conversion for performing the transposing process for 2×2 in the address converting circuit 180 in the embodiment of the present technology. In the 2×2 interleave mode, the address converting circuit 180 performs the address conversion to interchange the bit 0 and the bit 3 in the received address. With this, the above-mentioned transposing process for 2×2 is realized.

Figure 20:
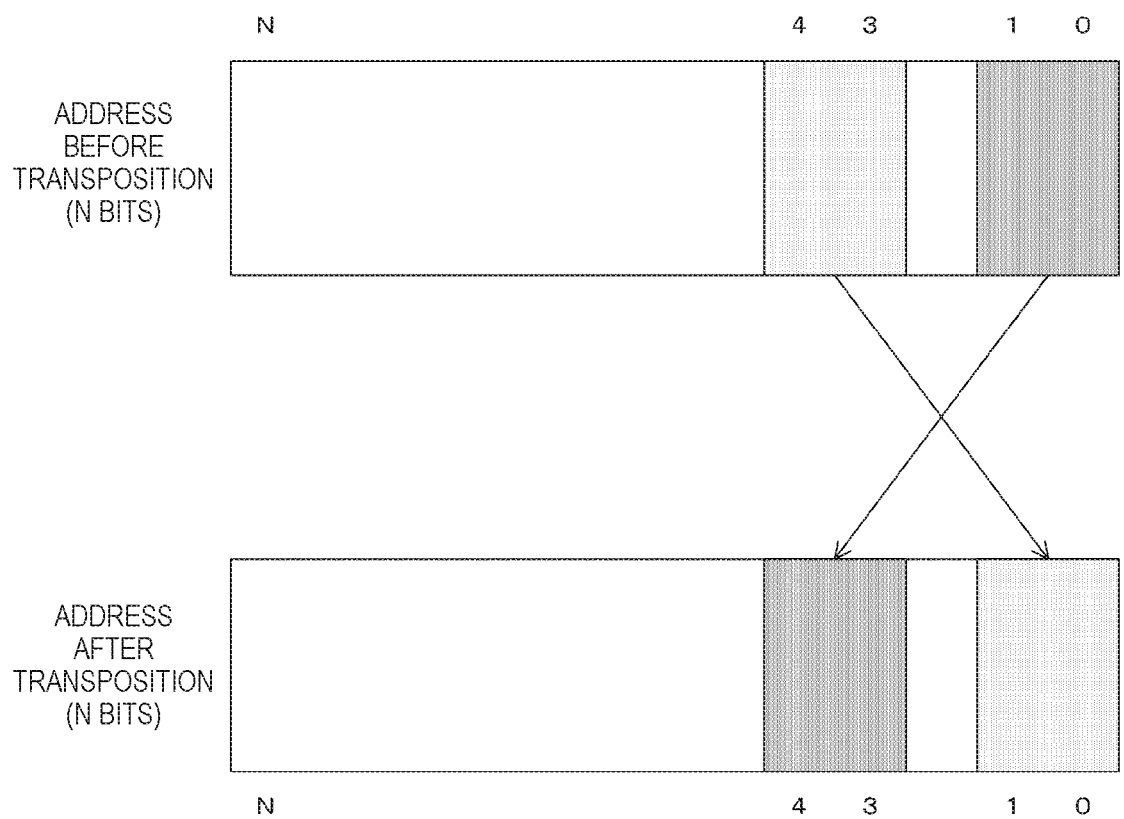
FIG. 20 is a diagram showing one example of the address conversion for performing the transposing process for 4×4 in an address converting circuit 180 in an embodiment of the present technology.

FIG. 20 is a diagram showing one example of the address conversion for performing the transposing process for 4×4 in the address converting circuit 180 in the embodiment of the present technology. In the 4×4 interleave mode, the address converting circuit 180 performs the address conversion to interchange the bit 0 to the bit 1 and the bit 3 to the bit 4 in the received address. With this, the above-mentioned transposing process for 4×4 is realized.

Figure 21:
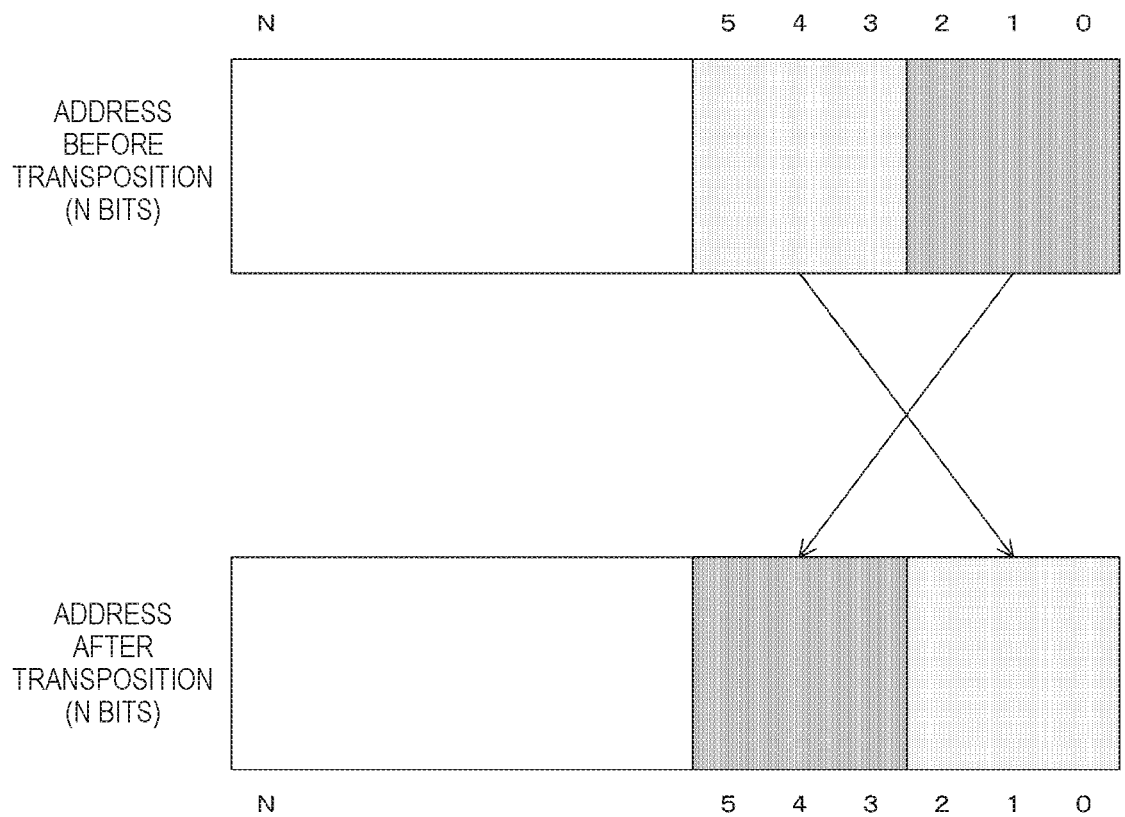
FIG. 21 is a diagram showing one example of the address conversion for performing the transposing process for 8×8 in an address converting circuit 180 in an embodiment of the present technology.

FIG. 21 is a diagram showing one example of the address conversion for performing the transposing process for 8×8 in the address converting circuit 180 in the embodiment of the present technology. In the 8×8 interleave mode, the address converting circuit 180 performs the address conversion to interchange the bit 0 to the bit 2 and the bit 3 to the bit 5 in the received address. With this, the above-mentioned transposing process for 8×8 is realized.

In this way, since the address converting circuit 180 rearranges the arrangement of the words in the plurality of banks 110 by the transposing process for a square matrix of a predetermined size, the address conversion is performed by interchanging bits corresponding to a predetermined size in the address.

The addresses to which the address conversion has been applied in unit of a power of 2 correspondingly to the bank interleave mode, are transmitted from the address converting circuit 180 to the crossbar circuit 120. In the crossbar circuit 120, the control for three types of selectors 121 to 123 is performed in accordance with the addresses to which this address conversion has been applied. With this, correspondingly to the bank interleave mode, the physical word arrangement in the banks 110 is changed.

In this way, according to the first embodiment of the present technology, a bank conflict can be prevented by converting addresses in the address converting circuit 180 such that the arrangement of the words in the plurality of banks 110 is rearranged by the transposing process for a square matrix.

2. Second Embodiment

In the above-mentioned first enforcement, data are transposed in units of a power of 2 of 2×2, 4×4, and 8×8 by the address conversion, whereby it has been shown that a bank conflict can be cancelled in various access address intervals. However, there may be a case where a bank conflict cannot be cancelled even by the above-mentioned bank interleave, such as a case where the address intervals of all the arithmetic units 200 are not an equal interval. In such a case, a bank conflict can be cancelled by software, such as creation of a program so as to separate accesses causing a bank conflict into a former and a latter in terms of time, but, on the other hand, the easiness of program creation lowers. For this reason, in the following, description is given for an example of coping with a bank conflict unable to be cancelled even with the above-mentioned bank interleaves, by hardware, i.e., by adding a circuit to arbitrate a bank conflict in the memory apparatus.

In this connection, the basic constitution of the memory apparatus of the second embodiment is the same as that in the above-mentioned first embodiment. A point different from the above-mentioned first embodiment is to include a function that detects bank conflicts in the selector control circuit 130 of the crossbar circuit 120 and to arbitrate them. Therefore, in the following, this point will be described in detail.

[Constitution of Memory Apparatus]

Figure 22:
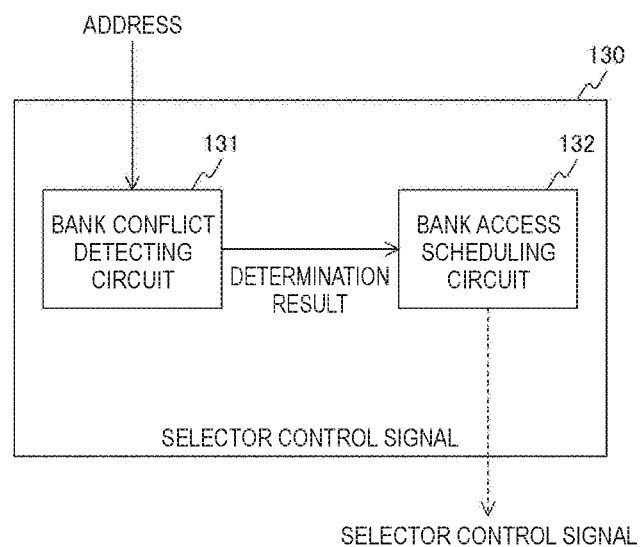
FIG. 22 is a diagram showing one constitution example of a selector control circuit 130 in a second embodiment of the present technology.

FIG. 22 is a diagram showing one constitution example of the selector control circuit 130 in the second embodiment of the present technology. This selector control circuit 130 includes a bank conflict detecting circuit 131 and a bank access scheduling circuit 132.

The bank conflict detecting circuit 131 is a circuit that detects competition in access, i.e., occurrence of a bank conflict for each of the banks 110. Upon receipt of an address from the address converting circuit 180, the bank conflict detecting circuit 131 determines existence or nonexistence of occurrence of a bank conflict for each of the banks 110, and, supplies the determination result to the bank access scheduling circuit 132. It should be noted that the bank conflict detecting circuit 131 is one example of a detecting section described in claims.

The bank access scheduling circuit 132 is a circuit that arbitrates competition in access and performs scheduling of an access order on the basis of the determination result of the bank conflict detecting circuit 131. Upon receipt of the determination result from the bank conflict detecting circuit 131, with respect to a bank for which a bank conflict has occurred, the bank access scheduling circuit 132 performs scheduling so as to line up a plurality of accesses for the corresponding bank in the time direction. The bank access scheduling circuit 132 instructs the address selector 121 about the transmission source of an address on the basis of the scheduling result. Moreover, with respect to a write-in access, it instructs the write-in data selector 122 about the transmission source of data. Moreover, with respect to a read-out access, it instructs the read-out data selector 123 about the transmission source of data. It should be noted that the bank access scheduling circuit 132 is one example of an arbitrating section described in claims.

[Detection of Bank Conflict]

Figure 23:
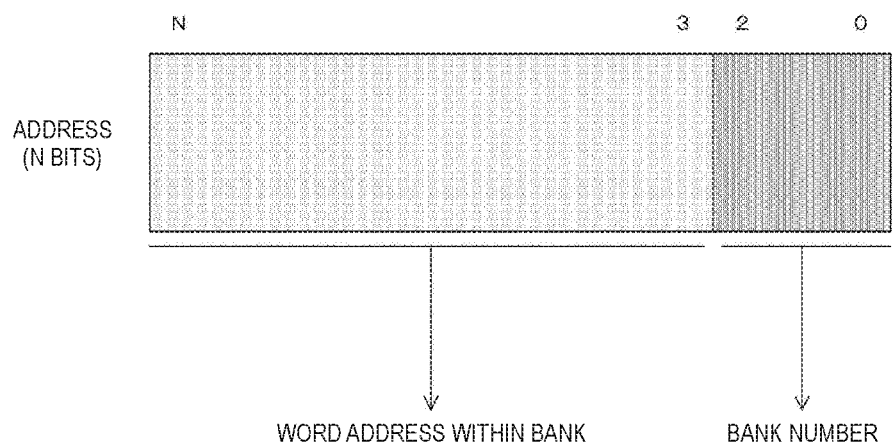
FIG. 23 is a diagram showing a relationship example between an address and a bank in a second embodiment of the present technology.

FIG. 23 is a diagram showing a relationship example between an address and a bank in the second embodiment of the present technology.

In the address received by the bank conflict detecting circuit 131 from the address converting circuit 180, bits 0 to 2 represent the number of a bank of an access target, and bits 3 to N represent a word address within a bank. The bank conflict detecting circuit 131 detects existence or nonexistence of a bank conflict with reference to the bank number and the word address within the bank in the received address.

In this connection, here, the reason why the bank number is represented by three bits and the word address within the bank is represented by (N−3) bits is that it is assumed that the number of banks in the memory apparatus in this embodiment is eight. The bit width of the bank number and the word address within a bank changes correspondingly to the number of banks in the memory apparatus.

Figure 24:
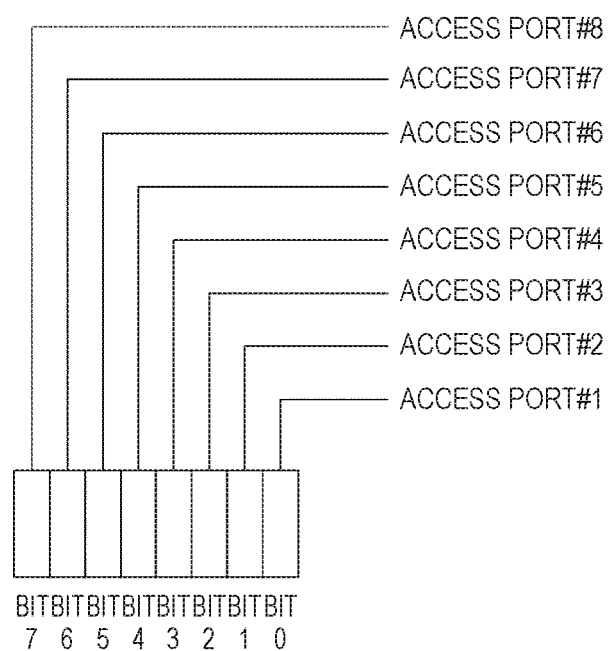
FIG. 24 is a diagram showing one example of access source port information in a second embodiment of the present technology.

FIG. 24 is a diagram showing one example of access source port information in the second embodiment of the present technology.

Upon detection of existence or nonexistence of a bank conflict, the bank conflict detecting circuit 131 notifies the bank access scheduling circuit 132 of access source port information corresponding to an address together with the detection result. The access source port information is represented with a bit map format, and it means that there is no access from the access port corresponding to "0", and, it means that there is an access from the access port corresponding to "1".

The bank access scheduling circuit 132 instructs the read-out data selector 123 corresponding to the access source port in which "1" is set with the bitmap, about a reception source bank of data simultaneously, whereby read-out data is made to be output to a port. With this, it is possible to unify a plurality of read accesses to the same address into one, whereby it is possible to improve the efficiency of memory access.

Figure 25:
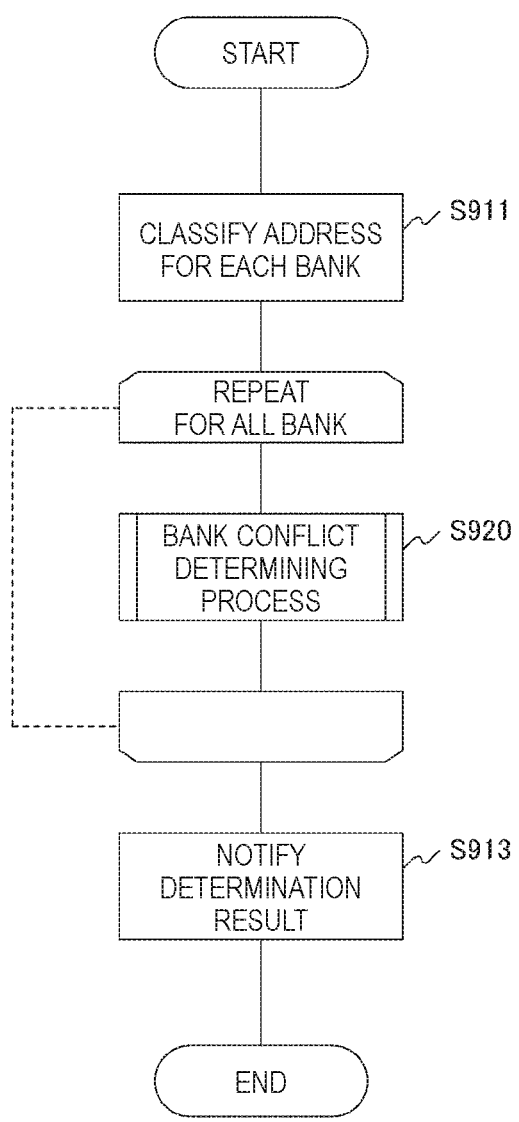
FIG. 25 is a flowchart showing a processing procedure example of a bank conflict detecting process in a second embodiment of the present technology.

FIG. 25 is a flowchart showing a processing procedure example of the bank conflict detecting process in the second embodiment of the present technology.

Upon receipt of addresses from the address converting circuit 180, the bank conflict detecting circuit 131 classifies the addresses for each bank on the basis of the bank number of each of the addresses (Step S911). Then, the bank conflict detecting circuit 131 determines existence or nonexistence of occurrence of a bank conflict for all the banks on the basis of the classified addresses (Step S920). Upon acquisition of the determination results for all the banks, the bank conflict detecting circuit 131 notifies the bank access scheduling circuit 132 of the determination result of each of the banks (Step S913).

Figure 26:
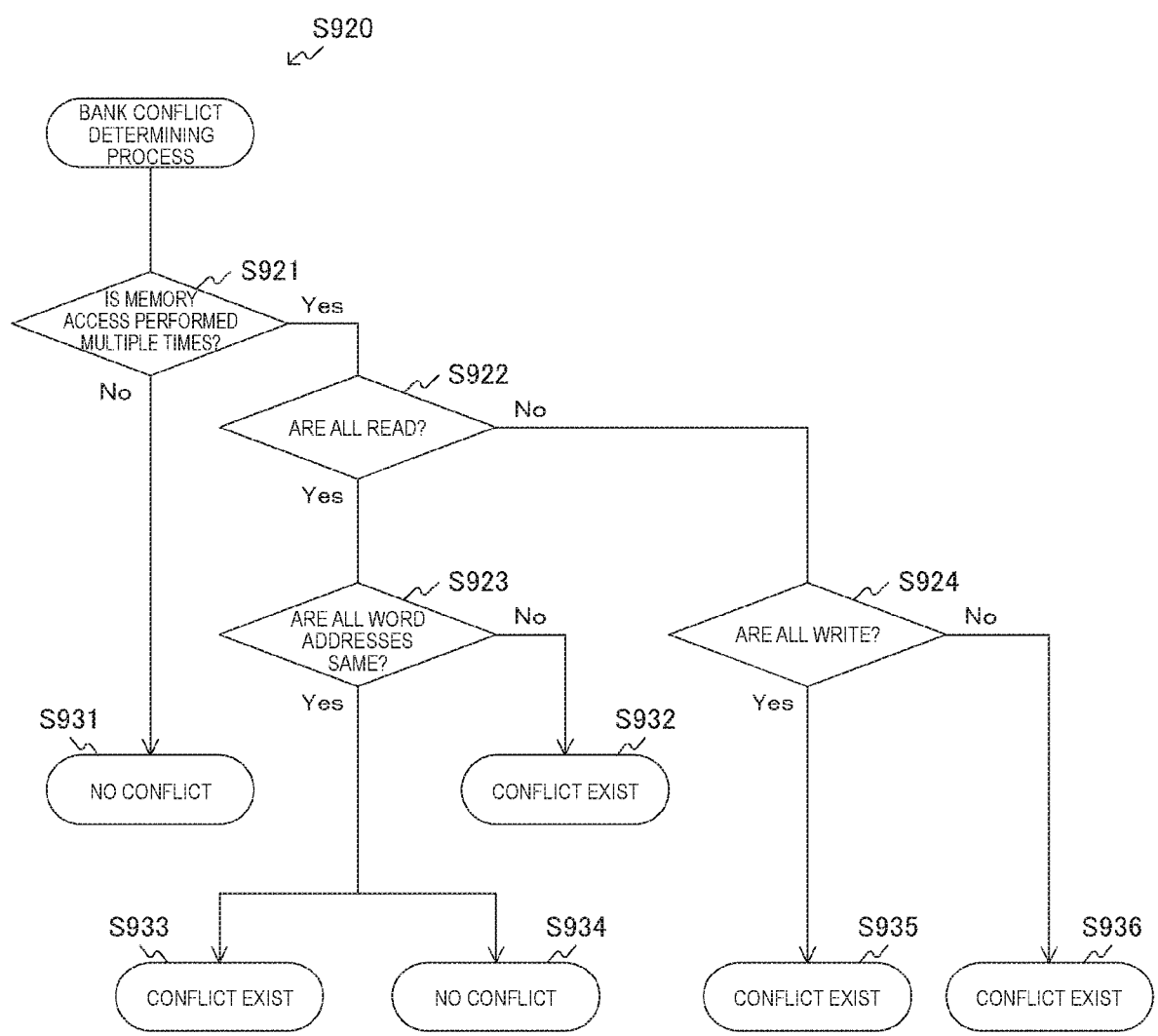
FIG. 26 is a flowchart showing a processing procedure example of a bank conflict determining process (Step S920) in a second embodiment of the present technology.

FIG. 26 is a flowchart showing a processing procedure example of the bank conflict determining process (Step S920) in the second embodiment of the present technology.

In the case where the memory accesses is not performed multiple times (Step S921: No), since a bank conflict does not occur, it is determined that there in "no conflict" (Step S931). On the other hand, in the case where the memory accesses is performed multiple times (Step S921: Yes), since there is a possibility that a bank conflict occurs, determining process is performed by the following criteria.

In the case where all the memory accesses are a read access (Step S922: Yes), it is determined whether all of the word addresses within the banks of them are the same (Step S923). In the case where all the word addresses within the banks are not the same, i.e., any of the word addresses is different from the others (Step S923: No), it is assumed that a plurality of addresses is being tried to be transferred to a bank that can receive only one address at the same time. Therefore, it is determined that "a conflict exists" (Step S932).

In the case where all the word addresses within the banks are the same (Step S923: Yes), similarly, since a plurality of addresses is being tried to be transferred to one bank, it is assumed that it is in a state of a bank conflict, and it is determined that "a conflict exists" (Step S933).

However, in this case (Step S923: Yes), by utilizing the matter that all the addresses are the same, the addresses to be transferred to a bank are unified into one, whereby it is possible to determine that "a conflict does not exist" (Step S934). That is, data from one bank 110 is distributed to a plurality of access ports 190 by the crossbar circuit 120, whereby simultaneous access becomes possible. This may arise in the case where a plurality of arithmetic units 200 requests the same data for the memory apparatus 100. Moreover, for example, in the case where the data width of the bank 110 is eight bytes and the data width of the access port 190 is four bytes, it can be applied also in a situation where upper four bytes are supplied to one of the arithmetic units 200 and lower four bytes are supplied to the other arithmetic unit 200. As compared with the case where the determination in Step S933 has been made and a read access to the same address is performed multiple times, in the case where determination in Step S934 is made on the presupposition that a plurality of read accesses to an address is unified into one, it is possible to improve the efficiency of memory access.

In the case where all the memory accesses are a write access (Step S924: Yes), the case where all the word addresses of them within the banks are not the same, is of course, even in the case where all the word addresses within the banks are the same, there is a possibility that write-in data may be different. Therefore, since the addresses of write accesses cannot be unified into one, a plurality of addresses becomes to be being tried to be transferred to one bank. Accordingly, it is determined that "a conflict exists" (Step S935).

On the other hand, in the case where read accesses and write accesses exist by being mixed (Step S924: No), accesses of different types such as a read access and a write access cannot be performed simultaneously irrespective of the word addressed of them within the banks. Therefore, in this case, it is determined that "a conflict exists" (Step S936).

FIG. 27 is a diagram showing one example of a request for the bank 110 for each of the access ports 190 in the second embodiment of the present technology. This example shows a situation where a request of a read access or a write access is output from the eight access ports 190 to the respective banks 110. The bank conflict detecting circuit 131 detects existence or nonexistence of a bank conflict with reference to the requests from these access ports 190.

FIG. 28 is a diagram showing one example of the detection results of a bank conflict in the second embodiment of the present technology. In this example, the requests from the access ports #2, #3, and #7 to the bank #8 are competing with each other, and it is shown that a bank conflict has occurred in the bank #8.

Figure 29:
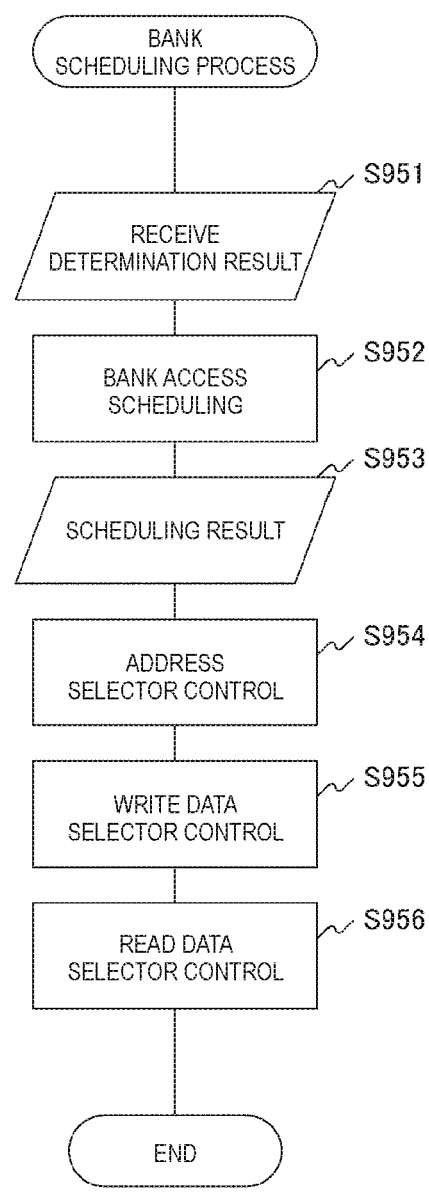
FIG. 29 is a flowchart showing a processing procedure example of a bank access scheduling process in a second embodiment of the present technology.

FIG. 29 is a flowchart showing a processing procedure example of the bank access scheduling process in the second embodiment of the present technology.

The bank access scheduling circuit 132 receives a determination result from the bank conflict detecting circuit 131 (Step S951). With respect to a bank in which a bank conflict has occurred, the bank access scheduling circuit 132 performs scheduling so as to line up a plurality of accesses to the above bank in a time direction (Step S952), and, creates a scheduling result (Step S953).

The bank access scheduling circuit 132 instructs the address selector 121 about the transmission source of an address on the basis of the scheduling result (Step S954). Moreover, the bank access scheduling circuit 132 instructs the write-in data selector 122 about the transmission source of data in a write-in access on the basis of the scheduling result (Step S955). Moreover, the bank access scheduling circuit 132 instructs the read-out data selector 123 about the transmission source of data in a read-out access on the basis of the scheduling result (Step S956).

Figures 30, 31:
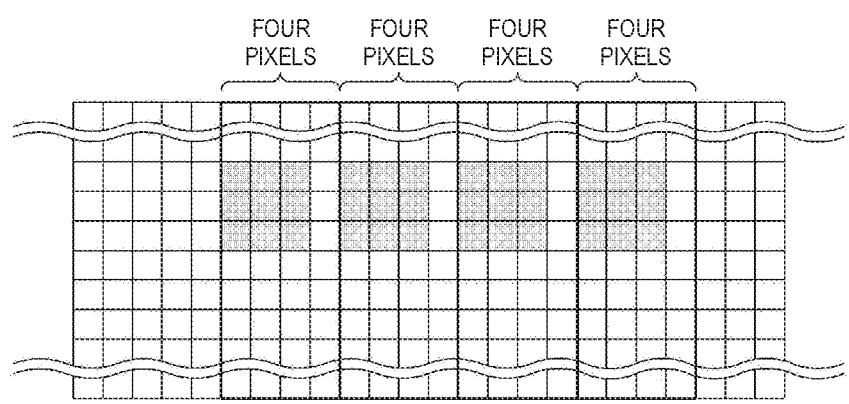
FIG. 30 is a diagram showing one example of a detection result of a bank access scheduling process in a second embodiment of the present technology.
FIG. 31 is a diagram showing one example of image data that become a target of a filtering process in a first application example in an embodiment of the present technology.

FIG. 30 is a diagram showing one example of the detection result of the bank access scheduling process in the second embodiment of the present technology. In this example, with respect to the access ports #2, #3, and #7 in which respective requests have competed with each other for the bank #8 in the above-mentioned detection result of a bank conflict, the scheduling is made such that the respective requests are executed over three cycles.

In this way, in the second embodiment, only accesses causing a bank conflict are executed sequentially over a plurality of cycles by the bank conflict detecting circuit 131 and the bank access scheduling circuit 132, whereby a bank conflict is arbitrated. With this, by coping with a bank conflict unable to be prevented only with the transposing process, it becomes possible to suppress the lowering of the throughput of bank access to a minimum. At this time, accesses that do not cause a bank conflict, can be executed in parallel within the same cycle as they are.

3. Application Example

In the above-mentioned embodiment, the description has been given for the constitution of the memory apparatus 100. However, in the following, as a specific application example of each interleave mode by software, description is given for an example in the case of applying to a filtering process in digital image processing. In a spatial filtering process, such as smoothing, sharpening, etc. in digital image processing, since it is possible to perform a filter arithmetic operation simultaneously in parallel for a plurality of pixels different in position, it is possible to make an image processing speed high more effectively by performing filtering processes in parallel.

First Application Example (Four Parallel Filtering Processes for Every Four Pixels)

FIG. 31 is a diagram showing one example of image data that becomes a target of a filtering process in the first application example in the embodiment of the present technology. This image data is divided into strip-shaped regions for every four pixels, and it is assumed that a 3×3 pixel averaging filter with a coefficient of "⅑" is applied for each of the regions. At this time, the four arithmetic units 200 are assigned one by one to the respective regions. Therefore, arithmetic operations with the 3×3 pixel averaging filters are performed in four parallels simultaneously among the regions.

FIG. 32 is a diagram showing an arrangement example of image data for the banks 110 in the first application example in the embodiment of the present technology. Each pixel of the image data is stored in each word of the memory apparatus 100 in the order of raster scan. Therefore, the adjacent data is arranged across in the different banks 110.

Figure 33:
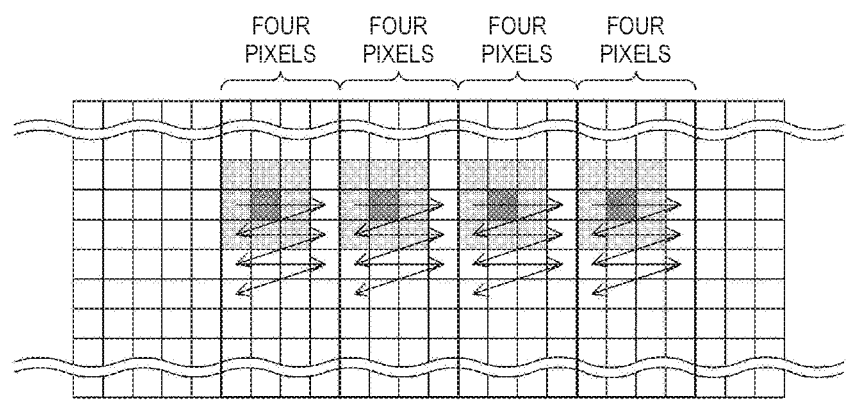
FIG. 33 is a diagram showing a shift mode example of a filtering process target for image data in a first application example in an embodiment of the present technology.

FIG. 33 is a diagram showing a shift mode example of a filtering process target for the image data in the first application example in the embodiment of the present technology. The 3×3 pixel averaging filter with the central pixel serving as reference shifts within the strip-shaped region with a width of 4 pixels in the order of raster scan. At this time, since the central pixel of the averaging filter is made to serve as reference, the right and left of the average filter may protrude from the strip-shaped region.

Figure 34:
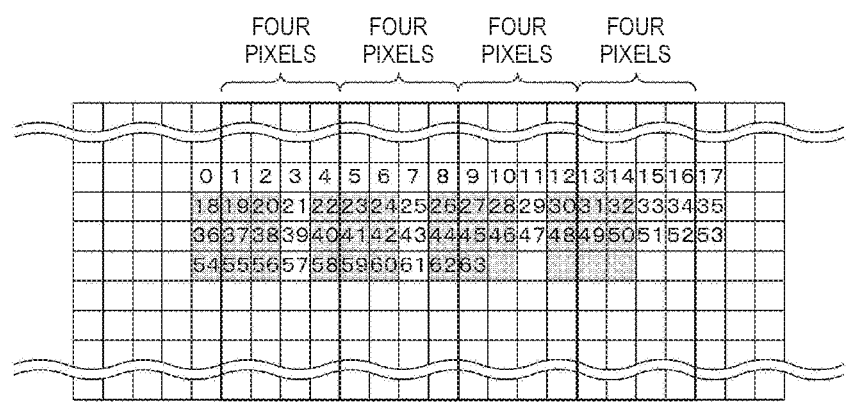
FIG. 34 is a diagram showing an access mode example for image data in a first application example in an embodiment of the present technology.

FIG. 34 is a diagram showing an access mode example for the image data in the first application example in the embodiment of the present technology. In the case where the 3×3 pixel averaging filter performs processing at the positions in the same diagram, the address of an upper left pixel among the 3×3 pixels becomes "18", "22", "26", and "30". In the case of performing the arithmetic operation of the averaging filter in parallel at the same time, a read access becomes necessary for these four addresses.

FIG. 35 is a diagram showing an access mode example of four parallel filtering processes for every four pixels in a general memory bank constitution. That is, if accesses for pixels at the addresses "18", "22", "26", and "30" are performed without performing the bank interleave according to the embodiment of the present technology, bank conflicts occur in the banks #3 and #7.

FIG. 36 is a diagram showing an access mode in a memory bank constitution of the first application example in the embodiment of the present technology. In this first application example, a region is divided for every four pixels, and an access address interval between respective filters becomes four words. Therefore, in the case where the bank interleave is performed by a 4×4 interleave mode with the transposing process for 4×4, occurrence of a bank conflict is canceled. That is, four parallel accesses are performed in the banks #3, #4, #7, and #8, and it becomes possible to access simultaneously for the memory apparatus 100 with respect to all the four filtering processes.

Second Application Example (Eight Parallel Filtering Processes for Every Two Pixels)

Figure 37:
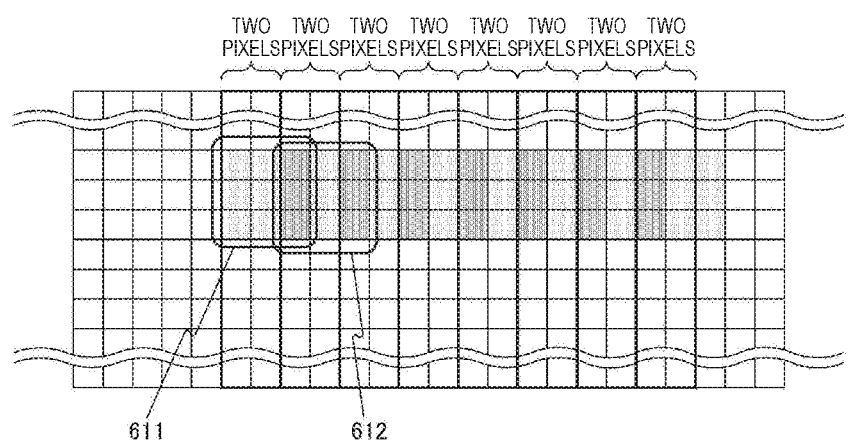
FIG. 37 is a diagram showing one example of image data that becomes a target of a filtering process in a second application example in an embodiment of the present technology.

FIG. 37 is a diagram showing one example of image data that becomes a target of a filtering process in the second application example in the embodiment of the present technology. In this example, it is divided into strip-shaped regions for every two pixels, and it is assumed that 3×3 pixel averaging filters with a coefficient of "⅑" are executed with eight arithmetic units 200 in parallel for each of the regions. At this time, the eight arithmetic units 200 are assigned one by one to the respective regions. Therefore, the arithmetic operations with the 3×3 pixel averaging filters are performed in eight parallels simultaneously among the regions.

In this connection, in this second application example, the storing mode for image data into the memory apparatus 100 and the shift mode of a filter in the region are the first application example. Accordingly, in order to increase the filtering process speed, it is considered that the degree of parallelism has been increased. However, in the above-mentioned first application example, duplication of pixel data that become a reference target simultaneously, did not occur between average filters. In contrast to this, in this second application example, duplication of pixel data that become a reference target simultaneously, may occur between an averaging filter 611 and an adjacent averaging filter 612 as shown in the same diagram.

Figure 38:
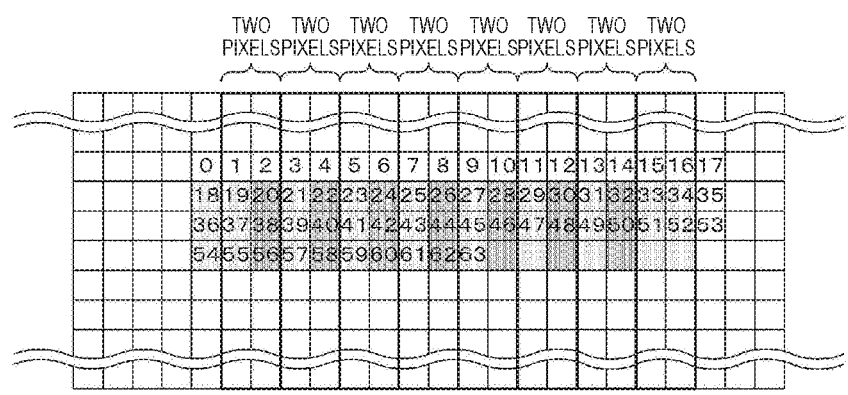
FIG. 38 is a diagram showing an access mode example for image data in a second application example in an embodiment of the present technology.

FIG. 38 is a diagram showing an access mode example for the image data in the second application example in the embodiment of the present technology. In the case where the 3×3 pixel averaging filter performs processing at the positions in the same diagram, the address of an upper left pixel among the 3×3 pixels becomes "18", "20", "22", "24", "26", "28", "30", and "32". In the case of performing the arithmetic operation of the averaging filter in parallel at the same time, a read access becomes necessary for these eight addresses.

FIG. 39 is a diagram showing an access mode example of eight parallel filtering processes for every eight pixels in a general memory bank constitution. That is, if accesses for pixels at the addresses "18", "20", "22", "24", "26", "28", "30", and "32" are performed without performing the bank interleave according to the embodiment of the present technology, bank conflicts occur in the banks #1, #3, #5 and #7.

FIG. 40 is a diagram showing an access mode in a memory bank constitution of the second application example in the embodiment of the present technology. In this second application example, a region is divided for every two pixels, and an access address interval between respective filters becomes two words. Therefore, in the case where the bank interleave is performed by a 2×2 interleave mode with the transposing process for 2×2, occurrence of a bank conflict is canceled. That is, eight parallel accesses are performed in the banks #1 to #8, and it becomes possible to access simultaneously for the memory apparatus 100 with respect to all the eight filtering processes.

In this way, with regard to the bank interleave mode, since an optimal mode is determined by an access mode of data in software, it is supposed to use bank interleave after incorporating mode designation in the program of software.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disc), a memory card, and a Blu-ray disc (registered trademark) can be used.

Note that the effects described in the present specification are not necessarily limited, and any effect described in the present disclosure may be exhibited.

Additionally, the present technology may also be configured as below.

(1)
A memory control apparatus, including:
a plurality of access ports that is used for accessing a plurality of memory modules in which an address is provided in a circulation manner for each word;
a plurality of address converting sections that converts the address to rearrange an arrangement of the words in the plurality of memory modules by a transposing process for a square matrix of a predetermined size; and
a connecting section that connects the plurality of memory modules and the plurality of access ports in accordance with a result of the address conversion.

(2)
The memory control apparatus according to (1), in which the predetermined size of the square matrix is a power of two.

(3)
The memory control apparatus according to (1) or (2), in which the address converting section performs interchanging of bits in accordance with the predetermined size in the address.

(4)
The memory control apparatus according to any of (1) to (3), in which the connecting section includes
a plurality of address selectors that is disposed for each of the plurality of memory modules and selects the address from the plurality of access ports, a plurality of write-in data selectors that is disposed for each of the plurality of memory modules and selects write-in data from the plurality of access ports, a plurality of read-out data selectors that is disposed for each of the plurality of access ports and selects read-out data from the plurality of memory modules, and a selector control section that controls the plurality of address selectors, the plurality of write-in data selectors, and the plurality of read-out data selectors in accordance with the address from the access port.

(5)

The memory control apparatus according to (4), in which the selector control section includes a detecting section that detects competition in access in the plurality of memory modules, and an arbitrating section that arbitrates competition in access detected by the detecting section and controls the plurality of address selectors, the plurality of write-in data selectors, and the plurality of read-out data selectors.

(6)

A memory apparatus, including:

a plurality of memory modules in which an address is provided in a circulation manner for each word;

a plurality of access ports that is used for accessing the plurality of memory modules;

a plurality of address converting sections that converts the address to rearrange an arrangement of the words in the plurality of memory modules by a transposing process for a square matrix of a predetermined size; and a connecting section that connects the plurality of memory modules and the access ports in accordance with the address conversion.

(7)

The memory apparatus according to (6), in which each of the plurality of memory modules is a memory bank.

(8)

An information processing system, including:

a plurality of memory modules in which an address is provided in a circulation manner for each word;

a plurality of access ports that is used for accessing the plurality of memory modules;

a plurality of arithmetic units that requires access for the plurality of memory modules via the plurality of access ports;

a plurality of address converting sections that converts the address to rearrange an arrangement of the words in the plurality of memory modules by a transposing process for a square matrix of a predetermined size; and a connecting section that connects the plurality of memory modules and the access ports in accordance with the address conversion.

(9)

A memory control method, including:

an address converting procedure in which, with respect to a plurality of accesses for a plurality of memory modules in which an address is provided in a circulation manner for each word, a plurality of address converting sections converts the address to rearrange an arrangement of the words in the plurality of memory modules by a transposing process for a square matrix of a predetermined size; and a connecting procedure in which a connecting section connects the plurality of memory modules and a request source of the access in accordance with a result of the address conversion.

REFERENCE SIGNS LIST 100 memory apparatus
110 memory bank
120 crossbar circuit
121 address selector
122 write-in data selector
123 read-out data selector
130 selector control circuit
131 bank conflict detecting circuit
132 bank access scheduling circuit
180 address converting circuit
190 access port
200 arithmetic unit

The invention claimed is:

1. A memory control apparatus, comprising:
a plurality of access ports that is used for accessing a plurality of memory modules in which an address is provided in a circulation manner for each word of a plurality of words;
a plurality of address converting sections that converts the address to rearrange an arrangement of the plurality of words in the plurality of memory modules by a transposing process for a square matrix of a predetermined size; and
a connecting section that connects the plurality of memory modules and the plurality of access ports in accordance with a result of the address conversion.

2. The memory control apparatus according to claim 1, wherein the predetermined size of the square matrix is a power of two.

3. The memory control apparatus according to claim 1, wherein the plurality of address converting sections performs interchanging of bits in accordance with the predetermined size in the address.

4. The memory control apparatus according to claim 1, wherein the connecting section includes
a plurality of address selectors that is disposed for each of the plurality of memory modules and selects the address from the plurality of access ports,
a plurality of write-in data selectors that is disposed for each of the plurality of memory modules and selects write-in data from the plurality of access ports,
a plurality of read-out data selectors that is disposed for each of the plurality of access ports and selects read-out data from the plurality of memory modules, and
a selector control section that controls the plurality of address selectors, the plurality of write-in data selectors, and the plurality of read-out data selectors in accordance with the address from the plurality of access ports.

5. The memory control apparatus according to claim 4, wherein the selector control section includes
a detecting section that detects competition in access in the plurality of memory modules, and
an arbitrating section that arbitrates the competition in the access detected by the detecting section and controls the plurality of address selectors, the plurality of write-in data selectors, and the plurality of read-out data selectors.

6. A memory apparatus, comprising:
a plurality of memory modules in which an address is provided in a circulation manner for each word of a plurality of words;
a plurality of access ports that is used for accessing the plurality of memory modules;

a plurality of address converting sections that converts the address to rearrange an arrangement of the plurality of words in the plurality of memory modules by a transposing process for a square matrix of a predetermined size; and a connecting section that connects the plurality of memory modules and the plurality of access ports in accordance with the address conversion.

7. The memory apparatus according to claim 6, wherein each of the plurality of memory modules is a memory bank.

8. An information processing system, comprising:

a plurality of memory modules in which an address is provided in a circulation manner for each word of a plurality of words;

a plurality of access ports that is used for accessing the plurality of memory modules;

a plurality of arithmetic units that requires access for the plurality of memory modules via the plurality of access ports;

a plurality of address converting sections that converts the address to rearrange an arrangement of the plurality of words in the plurality of memory modules by a transposing process for a square matrix of a predetermined size; and a connecting section that connects the plurality of memory modules and the plurality of access ports in accordance with the address conversion.

9. A memory control method, comprising:

an address converting procedure in which, with respect to a plurality of accesses for a plurality of memory modules in which an address is provided in a circulation manner for each word of a plurality of words, a plurality of address converting sections converts the address to rearrange an arrangement of the plurality of words in the plurality of memory modules by a transposing process for a square matrix of a predetermined size; and a connecting procedure in which a connecting section connects the plurality of memory modules and a request source of the plurality of accesses in accordance with a result of the address conversion.

* * * * *